United States Patent [19]

Erkfritz et al.

[11] 4,311,418

[45] Jan. 19, 1982

[54] ADJUSTABLE AXIAL AND RADIAL LOCATING WEDGE ASSEMBLIES FOR AN INDEXABLE INSERT CUTTING TOOL

[75] Inventors: Donald S. Erkfritz, Clarkston; Lawrence A. Alfonsi, Warren, both of Mich.

[73] Assignee: General Electric Company, Columbus, Ohio

[21] Appl. No.: 162,426

[22] Filed: Jun. 24, 1980

[51] Int. Cl.³ .............................................. B26D 1/12
[52] U.S. Cl. ...................................... 407/39; 407/36; 407/46
[58] Field of Search ...................... 407/36, 37, 38, 39, 407/40, 41, 46

[56] References Cited

U.S. PATENT DOCUMENTS

| | | | |
|---|---|---|---|
| Re. 27,192 | 10/1971 | Milewski | 407/38 |
| 3,027,624 | 4/1962 | Payne | 407/37 |
| 3,121,939 | 2/1964 | Williams | 407/39 |
| 3,188,718 | 6/1965 | Wezel | 407/36 |
| 3,217,384 | 11/1965 | Wirfelt | 407/36 |
| 3,378,901 | 4/1968 | Dupuis | 407/38 |
| 3,555,644 | 1/1971 | Owen | 407/36 |
| 3,739,442 | 6/1973 | Lovendahl | 407/37 |
| 3,802,043 | 4/1974 | Garih | 407/46 |
| 3,847,555 | 11/1974 | Pegler et al. | 407/46 |

*Primary Examiner*—Harrison L. Hinson
*Attorney, Agent, or Firm*—Hedman, Casella, Gibson & Costigan

[57] ABSTRACT

A milling cutter which is adapted to be rotated about a central axis includes at least one insert pocket having opposed leading and trailing walls, as well as a rear wall. An indexable insert having front and rear planar surfaces is receivable in the insert pocket, along with at least one locking wedge, which is interposed between the insert and the pocket walls for securing the insert within the pocket. In accordance with the subject invention, an adjustable locating wedge is provided for regulating the axial location on the insert. The locating wedge, a portion of which is disposed in abutting relationship with the axially lowermost cutting edge of the insert, is received within a groove located in the rear wall of the insert pocket. The receiving groove is aligned with the insert and extends radially inwardly from the periphery of the cutter body. In addition, the receiving groove is disposed at an angle relative to the rear wall of the insert pocket such that as the position of the adjustable locking wedge is varied within the groove, its axial position relative to the cutter body is also varied. By this arrangement, the axial position of the insert, which rests on the locating wedge, can be adjusted. More specifically, as the position of the locating wedge is varied within the groove, its axial position is varied, thereby varying the axial position of the insert. In a preferred embodiment, an adjustable insert seat is provided to vary the radial position of the insert.

10 Claims, 3 Drawing Figures

ADJUSTABLE AXIAL AND RADIAL LOCATING WEDGE ASSEMBLIES FOR AN INDEXABLE INSERT CUTTING TOOL

This invention relates to an adjustable axial locating wedge and insert assembly for a milling or boring cutter. In a conventional milling cutter, an indexable insert is receivable in an insert pocket and is secured therein by a locking wedge. In accordance with the subject invention, a means is provided to adjust the axial position of the indexable insert relative to the cutter body thereby preventing problems which occur if all the inserts in the cutter are not adjusted to provide a constant tracking. The locating wedge of the subject invention is receivable in a groove formed in the rear wall of the insert pocket. The receiving groove, which is aligned with the insert, extends radially inwardly from the periphery of the cutter body. In addition, the receiving groove is disposed at an angle relative to the rear wall such that as the position of the locating wedge within the groove is altered, the axial position of the wedge relative to the cutter body is simultaneously altered. A portion of the locating wedge is disposed in abutting relationship with the lowermost cutting edge of the insert such that as the axial position of the wedge is changed, the axial position of the insert is adjusted. By this arrangement, all of the inserts in the milling cutter may be adjusted to the desired axial position thereby eliminating serious run out problems encountered in the art.

BACKGROUND OF THE INVENTION

The subject invention provides for a new and improved milling cutter having a unique axial locating wedge and insert assembly which permits the axial position of the insert to be regulated.

In the prior art, milling cutters are provided for machining metal parts made of cast iron, aluminum or steel. The prior art milling cutters are generally circular in configuration and are adapted to be rotated around a central axis. The cutters are provided with a plurality of insert pockets disposed around the periphery thereof, which are adapted to receive indexable cutting inserts, each insert having a plurality of sharpened cutting edges. The inserts must be securely clamped within the pockets and accurately located to define a constant axial plane and radial outer diameter. Stated differently, in order to provide a clean, smooth, machined cut, all the inserts in the cutter body are adjusted such that their cutting edges define a constant tracking and circular outer diameter in both the axial and radial planes.

In order to accurately locate and maintain the indexable inserts within each pocket, various wedge assemblies have been employed which are mounted in the cutter pockets along with the inserts. More specifically, locking wedges have been provided which are interposed between the insert and the insert pocket to clamp the insert securely within the pocket during the cutting operation. This type of simple locking wedge arrangement is sufficient when all the inserts utilized have standard and constant dimensions. For example, in a conventional machining operation, when the cutting edges of the inserts become worn or chipped, the operator merely has to loosen the wedges and rotate or index the inserts to expose a fresh cutting edge. In this procedure, wherein the dimensions of the insert remain relatively constant, the inserts are merely discarded after all the edges have become worn. However, with the increasing use of diamond or borazon inserts, which have a relatively high initial cost, it has been necessary to regrind or relap the worn cutting dish and/or flank edges to extend the life of the insert. The regrinding alters the dimensions of the inserts such that it becomes impossible to maintain a uniform outer diameter in a boring cutter with fixed, non-adjustable pockets. When a uniform outer diameter and axial tracking cannot be maintained, serious run out problems occur which result in uneven and inaccurately machined parts.

In a copending application, U.S. patent application Ser. No. 138,197, filed Apr. 7, 1980, assigned to the same assignee as the subject invention, an improved method for dealing with insert position problems is disclosed and includes a means for adjusting the radial position of an insert within a fixed cutter body, and may be utilized to control critical insert to wedge overhang. The means disclosed in the latter application, the contents of which are incorporated herein by reference, include an adjustable insert seat having an L-shaped cut out on one surface thereof for receiving the indexable insert. A means is provided to adjust the radial position of the insert seat, which in turn, adjusts the radial position of the insert. While this adjustable insert seat functions to eliminate many of the problems associated with insert to wedge overhang, it would be desirable to provide an insert seat which is capable of radial adjustment to correct for tracking errors introduced with reground inserts, while maintaining the original characteristics of the cutter. Other examples of wedge assemblies which provide a degree of adjustability in a single plane can be found in U.S. Pat. No. 3,708,843, to Erkfritz, issued Jan. 3, 1973, and French Pat. No. 2,406,493 issued May 18, 1979. While the latter patents provide for adjustability in a single plane, it would also be desirable to provide an adjustable wedge assembly which can compensate for tracking errors in both the axial and radial planes to produce a consistant depth of cut plane and circular outer diameters.

Accordingly, it is an object of the subject invention to provide a new and improved locating wedge and insert assembly which permits the accurate adjustment of the axial position of the insert.

It is a further object of the subject invention to provide an adjustable locating wedge and insert assembly wherein an adjustable locating wedge is provided which is aligned and in abutting relationship with the lowermost cutting edge of the insert such that when the axial position of the wedge is varied, the axial position of the insert is varied.

It is another object of the subject invention to provide an adjustable locating wedge and insert assembly which includes both an axially locating wedge and an adjustable insert seat such that both the axial and radial position of the insert can be adjusted to eliminate run out problems and provide accurate and smooth machining.

It is still a further object of the subject invention to provide an adjustable locating wedge and an indexable insert assembly which may be employed to adjust a plurality of randomly sized, reground inserts in fixed insert pockets of a milling cutter.

SUMMARY OF THE INVENTION

According to the present invention there is provided a new and improved adjustable locating wedge and indexable insert assembly for use with a circular milling or boring cutter. A milling cutter, which is intended to be rotated about its central axis, is provided with a plurality of pockets disposed in, an opening out of the periphery thereof. Each insert pocket is provided with opposed leading and trailing walls, as well as a rear wall which is disposed perpendicular thereto. The terms "leading" and "trailing" as used in the art, are defined in the relation to the intended direction of the rotation of the milling cutter with the leading surfaces preceeding the trailing surfaces during a cutting operation.

An indexable insert, having generally planar front and rear rake surfaces, and a plurality of cutting edge faces disposed therebetween, is receivable in the insert pocket. A locking wedge is provided which is interposed between one face of the insert and one of the insert pocket walls for clamping the insert securely within the pocket during a cutting operation.

An adjustable insert seat, similar to the one disclosed in U.S. patent application Ser. No. 138,197 may be provided which is receivable in the insert pocket for adjusting the radial position of the insert. More specifically, an insert seat may be provided having opposed leading and trailing surfaces, with the planar leading surface being in abutting relationship with the leading wall of the insert pocket. The trailing surface of the insert seat is provided with an undercut portion such that the insert seat is L-shaped in configuration. An indexable insert is receivable in the undercut portion of the insert seat with the rear cutting edge of the insert being in abutting relationship with a rear support portion of the insert seat. A means is provided for varying the radial position of the insert seat which, in turn, varies the radial position of the insert.

In accordance with the subject invention, an adjustable locating wedge means is provided for regulating the axial position of the insert. The locating wedge, a portion of which is in abutting relationship with the lowermost cutting edge of the insert is received within a groove located in the rear wall of the insert pocket. The receiving groove is aligned with the indexable insert, and extends radially inwardly from the periphery of the cutter body. In addition, the receiving groove is disposed at an angle relative to the rear wall, such that as the location of the locating wedge is varied within the groove, its axial position relative to the rear wall is varied. A means, such as a differential screw, is provided for adjusting the position of the locating wedge within the receiving groove. The screw varies the axial position of the locating wedge, which in turn, varies the axial position of the insert, which is resting on the wedge.

In a preferred embodiment of the subject invention, the locating wedge comprises a cylindrical plug member and an upstanding generally planar wedge member. The groove in the bottom wall, which is configured to receive the wedge, includes a generally cylindrical portion and a narrow channel for slidably receiving the planar wedge member. This arrangement provides for a sturdy assembly and enables the entire length of the cutting edge of the insert to be supported while the structural integrity of the bottom wall is not significantly reduced. Further, the combination of the narrow channel and the upwardly extending planar wedge member functions to prevent the unwanted rotation or movement of the plug member during a cutting operation.

In use, to adjust the axial and radial position of the insert, the locating wedge means of the subject invention which defines a support for the indexable insert, is initially adjusted within the receiving groove until the desired axial location of the insert is achieved. Thereafter, the radial position of the insert may be set by adjusting the radial position of the insert seat. Once the desired axial and radial location of the insert is set, a locking wedge is tightened within the insert pocket until the insert is securely clamped in place. This procedure is repeated with each insert at each insert pocket to achieve uniform and constant axial tracking and radial outer diameters which will produce accurate and smooth machined cuts.

DESCRIPTION OF THE PREFERRED EMBODIMENT

Figure 1:
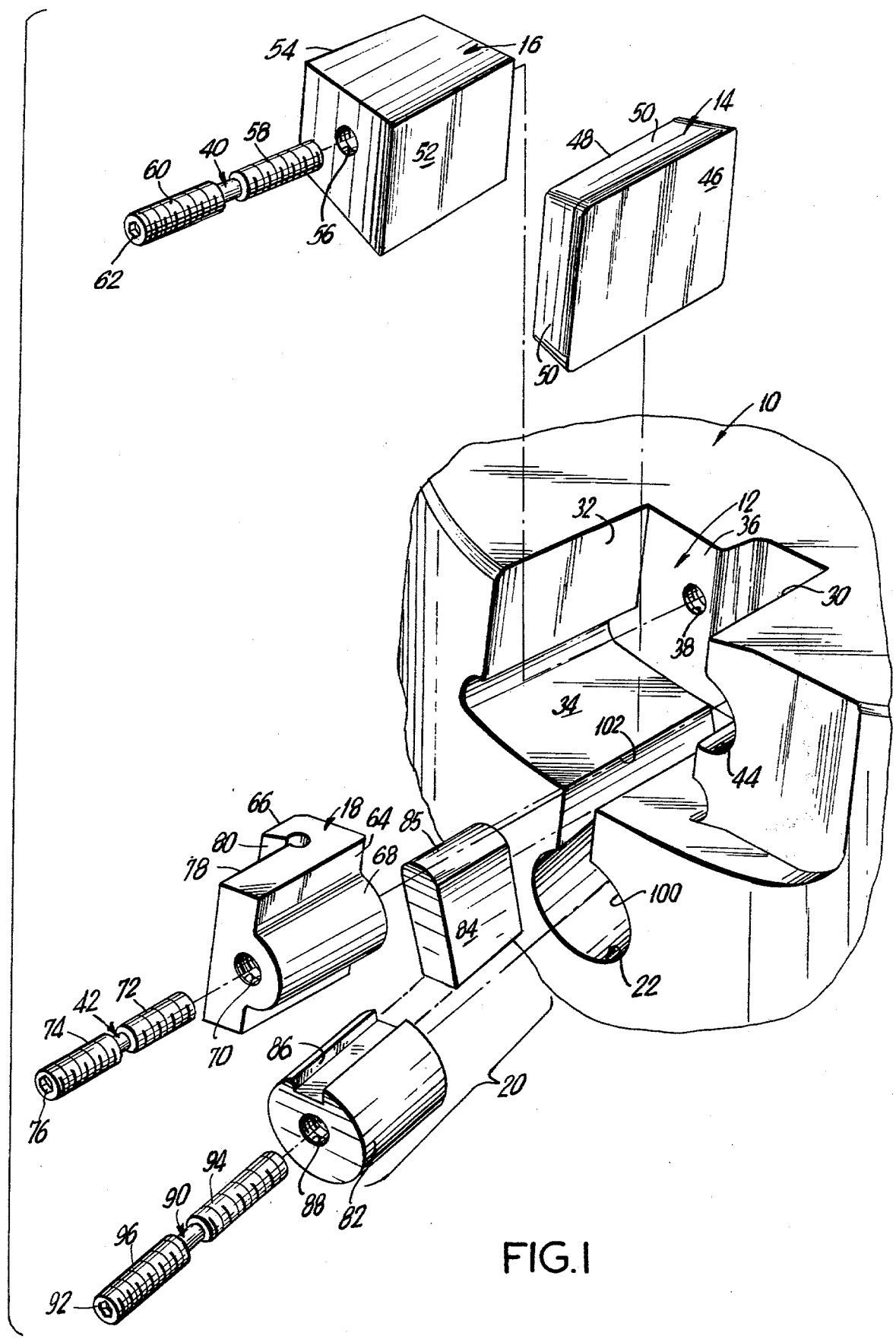
FIG. 1 is an exploded perspective view of the new and improved adjustable locating wedge means and indexable insert assembly of the subject invention, which illustrates its use in a fixed insert pocket of a circular cutter body, a portion of which is shown.

Referring to FIG. 1, a portion of a cutter body 10 is illustrated which is generally circular in configuration and adapted to be rotated about a central axis during a cutting operation. The cutter body is provided with a plurality of insert pockets, one of which is illustrated and is designated generally by the numeral 12. The insert pocket 12 is configured to receive an indexable cutting insert 14, which is secured therein by locking wedge 16. An insert seat 18 for adjusting the radial position of the insert is also receivable within the insert pocket 12. Further, and in accordance with the subject invention, a locating wedge means, indicated generally by the numeral 20, is provided for regulating the axial location of the insert 14 and is receivable in groove 22 formed in the rear wall of the insert pocket.

The insert pocket 12 is provided with opposed, planar leading and trailing walls 30 and 32, as well as a rear wall 34 disposed essentially perpendicular to the leading and trailing walls. The floor 36 of the insert pocket includes a threaded aperture 38 for receiving differential screw 40 of locking wedge 16. The floor 36 further includes a second threaded aperture (not shown) for receiving differential screw 42 of the insert seat 18. The leading wall 30 of the insert pocket is provided with a semi-circular recess 44 which acts as a guide for the insert seat 18, as more fully described hereinafter.

Figure 2:
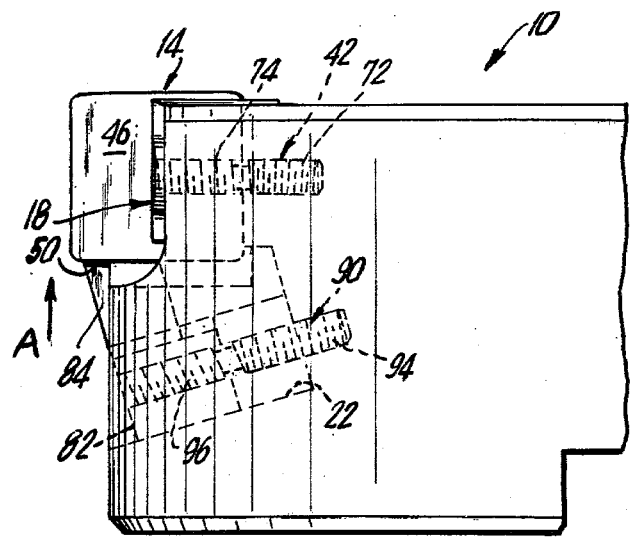
FIG. 2 is a side view of an insert pocket in a cutter body illustrating the adjustable locating wedge means and insert assembly of the subject invention.
Figure 3:
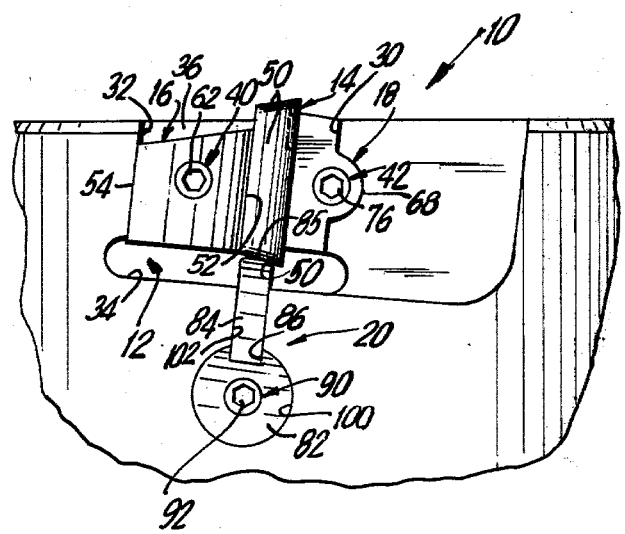
FIG. 3 is a top view of an insert pocket of a cutter body illustrating the adjustable locating wedge means and indexable insert assembly, as illustrated in FIG. 2.

As illustrated in FIGS. 1–3, a square, positively cleared insert is shown which includes front and rear planar rake surfaces 46 and 48, as well as a plurality of cutting edge faces 50. While a square insert is shown, the subject invention is intended to be used with any of the conventional industry insert configurations such as round, triangular, hexagonal, etc. In order to clamp the insert 14 in place, a locking wedge 16 is provided having opposed leading and trailing surfaces 52 and 54. The leading surface 52 is disposed at a non-parallel angle to trailing surface 54 to provide the wedge-like action necessary to clamp the insert 14 within the pocket 12. As illustrated in FIG. 3, the insert 14 and locking wedge 16 are receivable within the insert pocket 12 with the trailing surface 54 of the wedge being in abutting relationship with the trailing wall 32 of the insert pocket and the leading surface 52 of the wedge being in abutting relationship with the rear planar surface 48 of the insert. The locking wedge 16 is provided with a threaded aperture 56 for receiving differential screw 40. Differential screw 40 is provided with radially inner and outer threaded portions 58 and 60 which are threaded in opposite directions. Differential screw 40 is further provided with a non-circular recess 62 to accommodate a suitable driver. In use, the radially inner threaded portion 58 is received within threaded aperture 38 in floor 36 of the insert pocket 12, while the radially outer threaded portion 60 is received within threaded aperture 56 of locking wedge 16. By rotating the differential screw 40 the radial position of wedge 16 can be adjusted to lock the insert 14 within the pocket 12.

In order to regulate the radial location of insert 14, an insert seat 18 is provided, having opposed leading and trailing surfaces 64 and 66, respectively. Leading surface 64 includes a longitudinally extending semi-circular detent 68 which is receivable in semi-circular recess 44 of the leading wall 30 of the insert pocket. A threaded aperture 70 is provided in the insert seat 18 for receiving differential screw 42. Preferably, the longitudinal axis of aperture 70 is disposed parallel to rake faces 46, 48 of the insert and pocket wall 30 rather than parallel to the pocket wall 32 to permit accurate correction of small tracking errors. Differential screw 42, having a non-circular recess 76, includes radially inner and outer threaded portions 72 and 74, which are oppositely threaded. In use, the radially outer threaded portion 74 is receivable in the threaded aperture 70 of the insert seat 18, while radially inner threaded portion 72 is receivable in a threaded aperture (not shown) formed in the floor of the insert pocket 12. Rotation of the differential screw 42 functions to adjust the radial position of the insert seat 18.

The trailing surface 66 of the insert seat 18 is provided with an undercut portion such that the overall configuration of the insert seat is L-shaped. The undercut portion functions to define leading and radial locating supports 78 and 80 for receiving insert 14. More specifically, in use, the front planar surface 46 of insert 14 is disposed in abutting relationship with the leading locating support 78 of the insert seat 18, while an edge face 50 of the insert is disposed in abutting relationship with the radial locating support or rail 80. By this arrangement, the locating rail acts as a radially adjustable floor for the insert 14. Stated differently, the radial position of the radial locating support 80 will determine the radial position of the insert 14. In use, the radial location of the insert seat 18 is adjusted by rotating differential screw 42, which in turn, regulates the radial position of the insert 14. Thereafter, locking wedge 16 is adjusted radially inwardly until the insert 14 is securely clamped between the wedge 16 and the insert seat 18, as illustrated in FIG. 2.

As noted above, it is desirable to provide a wedge assembly which enables the adjustment of both the axial and radial position of the insert. Accordingly, a new and improved adjustable axial locating wedge 20 is provided which will enable the accurate adjustment of the axial position of the insert 14. More specifically, a locating wedge 20 is provided and includes a generally cylindrical plug member 82 and an upstanding planar wedge member 84. The upper surface 85 of the wedge member 84 is rounded to accommodate various insert configurations. Further, the upper surface 85 of wedge member 84 is disposed at an angle relative to the lower surface thereof. The locating wedge 20 is intended to be received within the groove 22 formed in the rear wall 34 of the insert pocket such that the upper portion thereof is in abutting relationship with the axially lowermost cutting edge face 50 of the insert.

The cylindrical plug member 82 is provided with a longitudinally extending slot 86 for receiving the lower edge of the wedge member 84. The wedge member 84 is interfit and secured within the groove 86 of plug member 82 by, for example, press fitting or tack welding. In the alternative, the plug member 82 and the wedge member 84 may be formed of a one piece unit or integrally investment cast. The connection between the members 82 and 84 must be rigid such that when the position of the plug 82 is varied, the position of the wedge member 84 will be similarly varied.

Plug member 82 includes a threaded aperture 88 for receiving differential screw 90. Similar to the other differential screws 40 and 42, differential screw 90 is provided with a non-circular recess 92, as well as oppositely threaded radially inner and outer portions 94 and 96, respectively. The radially outer threaded portion 96 is received within the threaded aperture 88 of plug member 82, while the radial inner threaded portion 94 is received in a threaded aperture (not shown) disposed at the rear of receiving groove 22.

Receiving groove 22 is configured to slidably receive adjustable locating wedge 20 and consists of a cylindrical portion 100, as well as a narrow channel portion 102 for guiding the planar wedge member 84. As illustrated in FIG. 3, the channel portion 102 of receiving groove 22 is aligned with the insert 14 such that the upper rounded surface 85 of the wedge member 84 will be in abutting relationship with the insert 14. The receiving groove 22, which extends radially inwardly from the periphery of the cutter body 10 is inclined upwardly relative to the rear wall 34 of the insert pocket, as more particularly illustrated in FIG. 2. By this arrangement, as the position of the locating wedge 20 is varied within the groove 22, the axial location of upper surface 85 of the wedge member 84 will also be varied, enabling the axial adjustment of the insert 14. The combination of narrow channel 102 with the upstanding wedge member 84 prevents the unwanted rotation of plug member 82 during a cutting operation. In a preferred embodiment of the subject invention, the angle of inclination of the groove 22 will complement the configuration of the wedge member 84 to facilitate maximum contact between the locating wedge 20 and the insert 14.

In use, it is desirable to accurately secure each insert 14 within each insert pocket 12 of the cutter body 10 to achieve a constant radial diameter and axial tracking. As should be apparent from the foregoing description, the subject invention facilitates the adjustment of the axial and radial position of each insert, thereby overcoming various problems such as insert run out. More specifically, to adjust the axial position of the insert 14, the location of the locating wedge 20 is adjusted within the receiving groove 22, by rotating differential screw 90. As illustrated in FIG. 2, as the position of the locating wedge 20 is adjusted radially inwardly within groove 22, the upper edge 85 of the planar wedge member 84 is axially raised, in the direction of arrow A. With the insert 14 in place, the position of the locating wedge 20 is varied within the receiving groove 22 until the desired axial position of the insert is achieved. For example, as the axial position of the wedge member 84 is raised by adjusting the locating wedge 20 radially inwardly, the axial position of the insert will be correspondingly elevated. Thereafter, the radial position of the insert 14 can be regulated by adjusting the radial position of the insert seat 18 using differential screw 42. Once the desired radial and axial positions are achieved, the insert 14 is locked securely in the insert pocket 12 by tightening the locking wedge 16 radially inwardly using differential screw 40 to achieve the configuration illustrated in FIG. 3. This procedure is then repeated with each insert and insert pocket about the cutter body such that a constant outer diameter is defined and run out problems are avoided.

In summary, the subject invention provides a new and improved adjustable locating wedge and insert assembly for an indexable cutting tool which facilitates the axial adjustment of an insert within the pocket of a cutter body. A milling cutter which is adapted to be rotated about a central axis includes at least one insert pocket having opposed leading and trailing walls, as well as a rear wall disposed perpendicular thereto. An indexable insert is received within the insert pocket and clamped therein by an adjustable locking wedge. In accordance with the subject invention, an adjustable locating wedge is provided and is received in a groove located in the rear wall of the insert pocket. The groove is disposed at an angle relative to the rear wall such that as the position of the locating wedge within the groove is varied, the axial position of the wedge is varied. The groove is aligned with the lowermost cutting edge of the insert such that a portion of the locating wedge is in abutting relationship with the insert. In use, the adjustment of the locating wedge within the groove varies the axial position of the insert to eliminate run out problems and to provide smooth machined cuts. In a preferred embodiment, an insert seat is provided for adjusting the radial position of the insert.

Although the subject invention has been described by reference to a preferred embodiment, it will be apparent that many other modifications could be devised by those skilled in the art that would fall within the scope and spirit of the present invention as defined by the appended claims.

We claim:

1. An adjustable axial locating wedge and indexable insert assembly for an indexable cutting tool, said cutting tool being generally circular and adapted to be rotated about its central axis, said cutting tool having at least one insert pocket disposed at and opening out of the periphery thereof, said pocket having opposed leading and trailing walls, with said pocket further including a rear wall disposed perpendicular to said leading and trailing walls, said adjustable locating wedge means and indexable insert assembly comprising:

an indexable insert having front and rear planar surfaces and a plurality of cutting edge faces disposed therebetween, said insert being received in said insert pocket with one of said planar surfaces being in abutting relationship with one of said pocket walls;

locking wedge means having leading and trailing planar surfaces, with said leading surface being disposed at an angle relative to said trailing surface, said locking wedge means being disposed between the other planar surface of said insert and the other wall of said insert pocket and in abutting relationship therewith, said locking wedge means being radially adjustable such that when the radial position of said locking wedge means is adjusted inwardly, said insert is securely clamped in said insert pocket between said locking wedge means and said one wall of said pocket;

adjustable locating wedge means for adjusting the axial position of said insert, with a portion of said locating wedge means being in abutting relationship with a cutting edge face of said insert, and with said rear wall of said insert pocket further including a locating wedge receiving groove, said groove being aligned with said insert and extending radially inwardly from the periphery of said cutter body and disposed at an angle relative to said rear wall, and with said adjustable locating wedge means being slidably received in said groove; and means for adjusting the position of said locating wedge means within said receiving groove, whereby the axial position of said insert may be varied by adjusting the position of said locating wedge means within said receiving groove which thereby varies the axial position of said locating wedge means.

2. An adjustable locating wedge means and indexable insert assembly as recited in claim 1 further including an insert seat for adjusting the radial position of said insert, said insert seat being interposed between said one wall of said insert pocket and said one planar surface of said insert, said insert seat having opposed leading and trailing surfaces with the leading surface thereof being in abutting relationship with said one wall of said insert pocket and with said trailing surface of said insert seat having an undercut portion such that said insert seat is L-shaped in configuration, said undercut portion defining planar, leading and radial locating supports, with said insert being receivable in said insert seat with said one planar surface of said insert abutting the leading locating support of said insert seat and with the radially innermost edge face of said insert abutting the radial locating support of said insert seat, said insert seat including a means for adjusting the radial location of said seat relative to said cutter body, whereby the radial position of said insert may be varied by adjusting the radial position of said insert seat.

3. An adjustable locating wedge means and indexable insert assembly as recited in claim 1 wherein said adjustable locating wedge means comprises a generally cylindrical plug member and a generally planar locating wedge member extending towards and in abutting relationship with said insert.

4. An adjustable locating wedge means and indexable insert assembly as recited in claim 3 wherein said wedge receiving groove includes a cylindrical portion for slidably receiving said cylindrical plug member and a narrow channel portion for slidably receiving said planar locating wedge member of said locating wedge means.

5. An adjustable locating wedge means and indexable insert assembly as recited in claim 4 wherein the angle of said locating wedge receiving groove is such that the distance between the central axis of said cylindrical portion and said rear wall decreases towards the central axis of said cutter body.

6. An adjustable locating wedge means and indexable insert assembly as recited in claim 3 wherein the portion of said planar locating wedge member which is in abutting relationship with said insert is rounded in configuration.

7. An adjustable locating wedge means and indexable insert assembly as recited in claim 3 wherein the surface of said planar locating wedge member, which is in abutting relationship with said insert, is disposed at an angle relative to the opposed surface thereof.

8. An adjustable locating wedge means and indexable insert assembly as recited in claim 3 wherein said plug member includes a longitudinally extending slot for receiving said planar locating wedge member, said members being fixedly connected.

9. An adjustable locating wedge means and indexable insert assembly as recited in claim 3 wherein said means for adjusting the position of said locating wedge includes a differential screw, said differential screw having radially inner and outer threaded portions, said inner portion having threading opposite in direction to said outer portion.

10. An adjustable locating wedge means and indexable insert assembly as recited in claim 9 wherein said adjustable plug means includes a threaded aperture for receiving said radially outer threaded portion of said differential screw, and wherein said insert pocket includes a floor having a threaded aperture aligned with said receiving groove for receiving the radial inner threaded portion of said differential screw whereby the rotation of said differential screw functions to vary the position of said axial locating wedge means within said receiving groove to thereby adjust the axial position of said insert.

* * * * *